Figure 1:
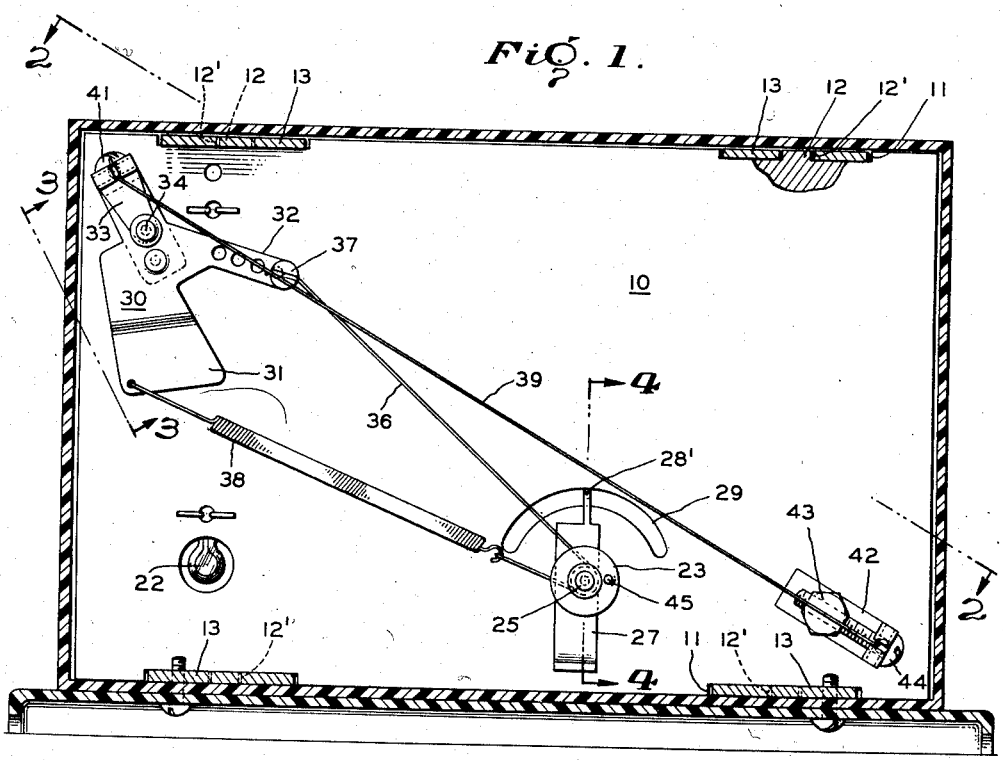

Feb. 19, 1957 W. L. W. OGDEN ET AL 2,781,664
HUMIDITY INDICATOR
Filed Aug. 26, 1955 2 Sheets-Sheet 1

INVENTORS
William L. W. Ogden.
Donald F. Murphy.
BY K. G. Doub
ATTORNEY

Feb. 19, 1957 W. L. W. OGDEN ET AL 2,781,664
HUMIDITY INDICATOR
Filed Aug. 26, 1955 2 Sheets-Sheet 2
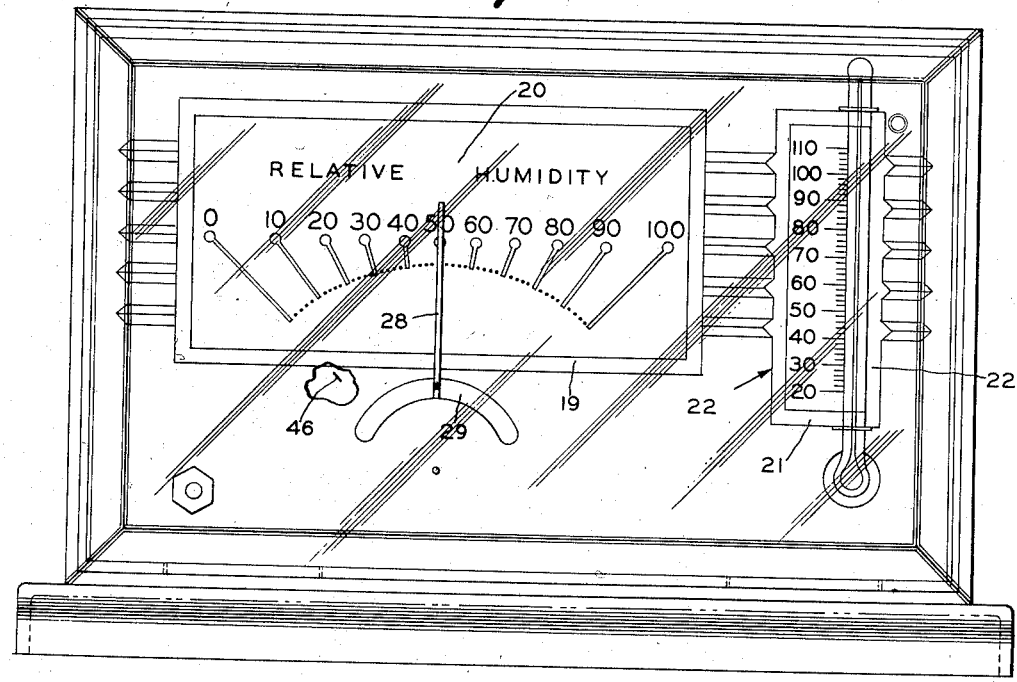
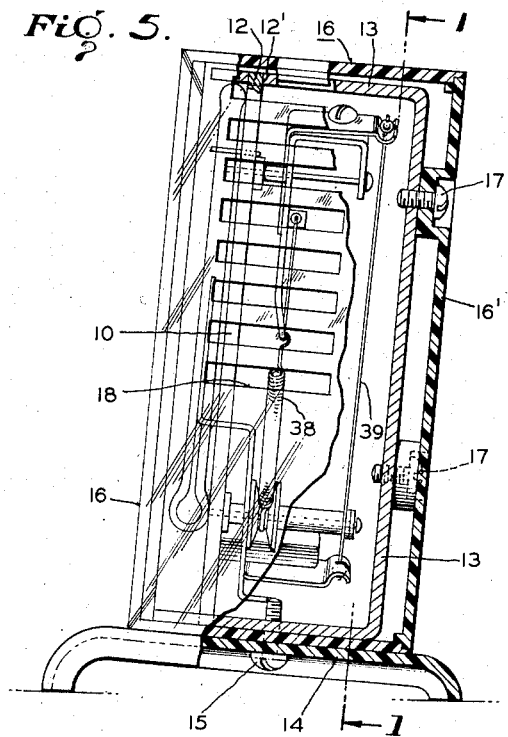
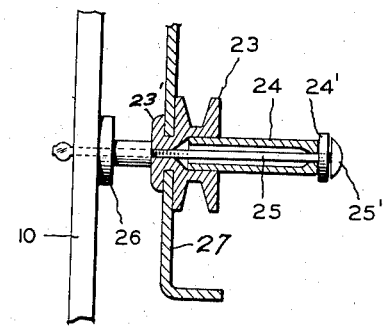
INVENTORS
William L. W. Ogden.
Donald F. Murphy.
BY K. G. Doub
ATTORNEY

United States Patent Office 2,781,664
Patented Feb. 19, 1957

2,781,664
HUMIDITY INDICATOR

William L. W. Ogden, Baltimore, and Donald F. Murphy, Towson, Md., assignors to Bendix Aviation Corporation, Baltimore, Md., a corporation of Delaware Application August 26, 1955, Serial No. 530,665

7 Claims. (Cl. 73—337)

This invention relates to humidity indicators and may be considered as an improvement over instruments of the type exemplified in prior U. S. Patents No. 2,086,853 to Chappell et al., and No. 2,651,941 to Windsor et al. The demand for a simple and compact device for indicating relative humidity has brought into the market numerous types of instruments which, while meeting the low-cost factor, are inaccurate and undependable. Instruments which utilize human hair as the hygroscopic element such as those of the above-noted patents, may be made to rigid specifications as to accuracy but the problem of low-cost manufacture has proved difficult to solve. While the instrument of Patent No. 2,651,941 constituted a stride in this direction, it soon became evident that further simplification without sacrifice in quality, eye-appeal and precise operation was necessary, and such is the primary object of the instant invention.

Another object is to provide a highly-simplified yet accurate humidity indicator wherein all of the operating components are carried by a single dial plate which may be removably mounted in a suitable case without danger of placing the plate under strain and changing the calibration of the instrument.

Another object is to provide a relatively small and compact humidity indicator utilizing a pulley and pointer assembly and a strand or cable type of hygroscopic element, such as human hair, wherein an element of relatively great length may be used without the necessity of passing the strands or cable over the pulley. Passing the strands of hair over a pulley is objectionable since it tends to not only crimp or put a "set" in the element but to also shield a portion of the element from exposure to the ambient air, thereby throwing the instrument out of calibration.

Another object is to provide, in a humidity indicator having a linear scale and a coacting pivotally-mounted pointer, unusually simple and dependable coacting leverage and spring tension means for converting the non-linear motion of a hair element into linear uniform motion of the pointer over the entire range of response of the instrument while maintaining the spring tension substantially constant.

The foregoing and other objects and advantages will become apparent in view of the following description taken in conjunction with the drawings, wherein:

Figure 1 is a section taken substantially on the line 1—1 of Figure 5, showing the inner side of the dial plate, which carries all of the operating parts of the instrument.

Figure 2:
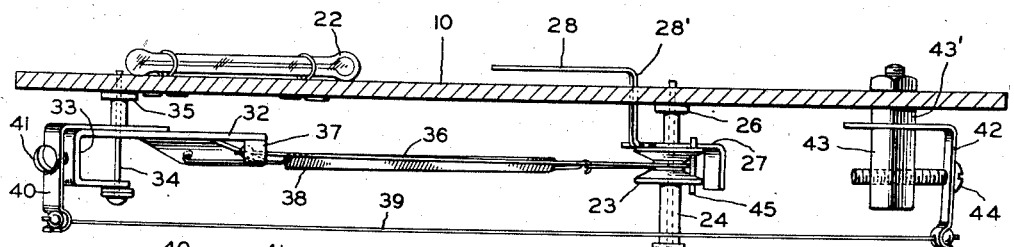
Figure 3:
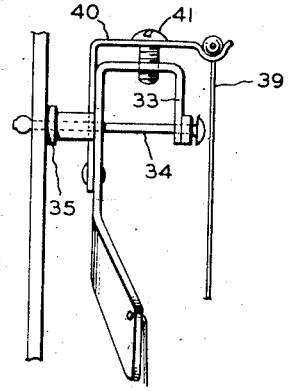

Figures 2, 3 and 4 are sections taken, respectively, on the lines 2—2, 3—3 and 4—4, Fig. 1.

Figure 5 is an end view of the instrument showing the dial plate mounted in its transparent case with the latter broken away in part; and Figure 6 is a front elevation of the instrument of Figure 5.

Referring to the drawings in detail, a dial plate is indicated at 10; in practice it consists of a rectangular piece of metal which may be cast, or it may be stamped from sheet stock. The notches at 11 with centered bosses 12 are provided to accommodate a pair of U-shaped supporting and mounting brackets 13, each having holes 12' in the upper and lower legs thereof to receive said bosses. This construction holds the plate firmly to the mounting brackets while at the same time it permits limited relative movement or a floating action between the plate and brackets and avoids possible deflection or bending and twisting of the plate when the brackets are secured to the base 14 as by screws 15. A case 16 comprises front and end walls of suitable material, such as clear thermoplastic, and a back plate 16', which is secured to the brackets 13 by screws 17. The case is vented to the atmosphere by slots 18 formed in the end walls of the case, note Fig. 5. A window frame 19 is formed in the front wall of the case; in the present instance where the entire wall is translucent, said frame is purely for ornamentation, but when the said front wall is made of opaque material, the frame defines an actual transparent or translucent section for exposing that portion of the dial plate which bears the scale 20 of the instrument. Another window frame 21, similar to that at 19, overlies a thermometer bulb 22 and coacting scale 22', carried by the dial plate 10.

The principal features of the invention reside in the highly simplified operating mechanism carried by the dial plate 10, note Figures 1 to 4, inclusive. Referring to these figures, a pointer assembly comprises a pulley 23, secured as by a press fit on the inner end of a small hollow stem 24, said stem and pulley being mounted for free rotation on a pin or small shaft 25, which at its inner end is fixed in a bushing 26, secured in the plate 10. At its outer end the pin 25 is headed, as at 25', and provided with a thrust washer 24', see Fig. 4. The inner end or side of the pulley 23 when originally shaped is formed with a projected stem portion over which is inserted the shank portion 27 of a pointer 28, the said extension of the pulley then being peened over the said shank to secure the latter to the pulley, note the grooved section 23' at the left-hand side of the pulley 23 as viewed in Fig. 4 in which the shank is seated. The shank 27 is in the form of a flat metallic strip which at its upper end continues on in the form of a pointer arm 28, note Fig. 2, having an intermediate offset portion 28' which projects through an arcuate slot 29 formed in the dial plate 10.

The pointer shank 27 constitutes a means for dynamically balancing the pointer pulley assembly, so as to avoid so-called "position errors," as will be more clearly explained in the description of operation.

At the upper left-hand corner of the dial plate as viewed in Fig. 1 is a bell crank assembly comprising a bell crank proper 30, made up of a sheet metal stamping, terminating at one extremity in arms 31 and 32 at its opposite extremity in a U-shaped combined mounting bracket and lever 33, the bell crank being pivoted on a pin 34, which projects therethrough and at its inner end is fixed in a bushing 35, in turn fixed in the plate 10.

As in the pointer assembly, the bell crank assembly is dynamically balanced, the arm 31 serving as a balancing weight.

A belt in the form of a non-hygroscopic filament or string 36 has a shot fixed to its one end and by means of which it is detachably connected to a small slotted crank post 37, carried by the arm 32, said belt being trained over the pulley 23 and having its other end connected to the contiguous end of a coil spring 38, which constitutes an extension of the belt and has its other end connected to the arm 31 of the bell crank 30.

The hygroscopic element 39 is preferably made up of a plurality of strands of hair arranged in the form of a cable and having their ends connected to suitable clamps, such as pieces of shot. The hygroscopic cable 39 is connected at its one end to an adjustable calibrating member 40 in the form of an angle-shaped piece of spring metal having one leg clamped against the adjacent portion of the U-shaped bracket 33 and its other leg projecting free across said bracket and terminating in a slotted curve retainer portion for receiving the upper end of the cable 39, note Figures 2 and 3. The free end of the member 40 is sprung outwardly against a calibrating screw 41, which projects through a hole formed in the member 40 and is threaded into the adjacent transverse portion of bracket 33. At its opposite or lower end, the hygroscopic element or cable 39 is anchored to the slotted U-shaped free end of an angle-shaped piece of spring metal 42, which is substantially similar to the member 40 except that in this instance its mounting leg is connected between a post 43 and aligned spacer 43′, anchored to the plate 10. A screw 44 projects through the free end of spring member 42 and is threaded through the post 43 and functions to locate the lower end of the hygroscopic element 39.

A so-called "phasing" pin 45 is projected through aligned holes in the flanges of the pulley 23 in binding engagement with the belt or string 36; it is simply pressed into binding or locking position so as to be readily released and replaced when initially determining the angular setting of the bell crank 30.

Operation and calibration

The spring 38 normally tends to rotate the bell crank 30 in a counter-clockwise direction as viewed in Fig. 1, which action is restrained by the hygroscopic cable 39. Thus should the cable expand in response to an increase in humidity, the pulley will rotate counter-clockwise and the pointer will move proportionately to higher values or percentages along the scale 20 of Fig. 6; a decrease in humidity having the opposite effect.

It is well known that the motion developed by a human hair element in response to changes in humidity is non-linear, the elongation of a strand of hair per unit length for a given percent change in relative humidity decreasing with increasing values of relative humidity. Hence if an equally divided scale is to be utilized, the motion transmitted from the hair element to a pointer or indicating hand must be linearized. This is accomplished in the present instance by the simple bell crank 30 through its two crank arms 32 and 33, arranged in predetermined angular relation. If a hair-elongation curve is plotted, with percent elongation as the ordinate and percent relative humidity as the abscissa, the curve so generated will be substantially the same as the arc of a circle, with the exception of the low or starting portion of the curve (low humidity). This represents the action which takes place when the hair element or cable 39 expands and contracts in response to changes in humidity; upon expansion, spring 38 rotates the bell crank 30 counter-clockwise (as viewed in Fig. 1), whereupon the non-linear response of said element is converted into linear motion due to the arc generated by the crank arms 32 and 33 and applied to the pointer 28 through the belt 36 and pulley 23, contraction of said element producing a similar rectification of non-linear motion but in the opposite direction. In the region of low humidity, the effective lever arm of the bell crank about its pivot is greatest, thus coordinating the action of the crank with the characteristics of the hair element.

The use of crank arms in various forms to convert non-linear into linear motion is, of course, broadly old in the art. In the present instance, however, the leverage system is coordinated with the pulley belt system in a manner such as to maintain the tension of the spring 38 substantially constant at all positions of the pointer 28, or during any condition of response of the hair element, to thereby maintain said element under constant tension. As the humidity increases and the hair element elongates, the spring will serve two functions; it will maintain the system under constant tension and also act as a motive force to move the pointer to a proportionately higher reading on the scale. Constant tension is maintained due to the fact that as the bell crank 30 and hence the arms 31 and 32 move in an arc over the effective range of the instrument, the take-up on one length of the belt 36 will be compensated for by a corresponding slack or release of the other length.

The design of the instrument is such that assembly and calibration may be performed with remarkable ease and facility. The bell crank and pulley-pointer assemblies are first mounted on the dial plate with sufficient pivot bearing clearance to ensure free rotation of the bell crank and pulley. As heretofore indicated, both of these parts are dynamically balanced to avoid "position" errors. Thus, irrespective of at which angle or position the instrument may be held or disposed, the moment arms of the bell crank and/or pointer should remain constant, or there should be little or no tendency of these parts to seek a given angular position. All of the operating parts, including the pointer are carried by the dial plate, which constitutes another simplification factor in manufacture and assembly.

Before mounting the hair element, the bell crank and pulley-pointer assemblies should be properly phased. To do this, the phasing pin 45 should be out or removed to permit free relative adjustment between the belt and pulley. The relative angular positions of the bell crank and pulley are now adjusted in a manner such that when the crank post 37 lies on a line extending from the center of the bell crank pivot 34 and the root of the pulley 23, the pointer 28 will fall on the phasing mark 46. By pulley "root" is meant the deepest surface of the pulley groove where the upper length of the belt 39 passes thereover.

The hair element may now be connected by inserting the shot clamps at each end thereof over the slotted U-shaped ends of the adjustable spring members 40 and 42.

The foregoing operations may conveniently be carried out before the dial plate 10 is assembled to its case 16. Assuming this to be the procedure followed, the dial plate is now assembled to the U-shaped brackets 13 by "springing" the legs of the brackets over the notches 11 of the dial plate with the bosses 12 in registration with the holes 12′. This assembly as a whole may then be secured to the base 14 by the screws 13.

To calibrate the instrument, it is only necessary to place it in atmospheres of different degrees of humidity and adjust the calibrating screw 41 to coordinate the hair element with the pointer and scale assembly, permitting the instrument to stabilize prior to each final setting. The screw 41 constitutes the sole adjustment, either for initial or subsequent calibration.

The case 16 and back plate 16′ may then be mounted to the base 14, completing the assembly.

Instruments made in accordance with the invention have exhibited a high degree of accuracy. The hair element may be of a length substantially equal to the diagonal expanse of the dial plate while at the same time it is not necessary to loop it over the pulley 23 or any other device which would impose friction on the element or tend to shield portions of the latter from the atmosphere. The number of operating parts are relatively few and in the main may be fabricated by simple stamping operations. Also, fine bearing tolerances are unnecessary and the assembling operations involve only a minimum of labor.

What is claimed and desired to be secured by United States Letters Patent is:

1. In a humidity indicator, a dial plate bearing a scale, a pivotally mounted pointer cooperating with said scale, a pulley operatively connected to the pointer for driving the latter, a belt of non-hygroscopic material trained over said pulley, a bell crank member pivotally mounted on said dial plate in spaced relation to said pulley in a plane substantially parallel to the plane of the plate and having a pair of angularly-extending arms to which the ends of said belt are connected and a third arm constituting a lever for exerting a driving torque on said bell crank member, a hygroscopic element in the form of a cable made up of hygroscopic material having its one end anchored to said dial plate and its other end connected to the third or driving arm of said bell crank, said belt incorporating spring means biasing said bell crank in a direction tending to tension said cable.

2. A humidity indicator as claimed in claim 1 wherein said third arm carries a resilient member to which the one end of said hygroscopic element is connected, and a calibrating screw is provided for adjusting said resilient member.

3. In a humidity indicator, a dial plate bearing a scale, a pivotally-mounted pointer cooperating with said scale, a pulley operatively connected to the pointer for driving the latter, a non-hygroscopic belt trained over said pulley, a coil spring constituting a length of said belt, a bell crank pivotally mounted on the dial plate in spaced relation to said pulley in a plane substantially parallel to the plane of the plate and having a pair of angularly extending arms to which the ends of said belt are connected and a third arm providing a lever for rotating the bell crank, and a hygroscopic element in the form of a cable of hygroscopic material having its one end anchored to said dial plate and its other end connected to said third or driving arm of the bell crank.

4. A humidity indicator as claimed in claim 3 wherein said bell crank and pulley-pointer assembly are dynamically balanced to avoid "position" erors should the instrument be tilted to different positions.

5. In a humidity indicator, a dial plate bearing a scale on one side thereof, a pulley pivotally supported on the opposite side of said plate and carrying a pointer cooperating with said scale, a bell crank member pivotally mounted on the dial plate remote from said pulley in a plane substantially parallel to the plane of the plate and having a pair of arms extending in angular relation therefrom and a third arm or lever for exerting a driving torque on said member, a belt made up of a length of non-hygroscopic material trained over said pulley, a coil spring constituting another length of said belt, said belt being connected to said pair of arms to provide a drive connection between said member and pulley, and a hygroscopic element in the form of a cable of hygroscopic material having its one end anchored to said dial plate and its other end connected to said third or driving arm, said pair of arms being of such relative length as to maintain the tension of the spring substantially constant throughout the effective range of the instrument and the relationship of the driving arm to one of said pair of arms being such as to linearize the drive connection between the hair element and the pointer.

6. A humidity indicator as claimed in claim 5 wherein bracket means are provided for supporting said dial plate, the arrangement being such as to permit said plate to have a limited floating action with respect to said bracket means.

7. In a humidity indicator, a dial plate bearing a scale, a pivotally mounted pointer cooperating with said scale, a pulley operatively connected to the pointer for driving the latter, a non-hygroscopic belt trained over said pulley, a bell crank pivotally mounted on said dial plate in spaced relation to said pulley in a plane substantially parallel to the plane of the plate and having a pair of angularly-extending arms to which the ends of said belt are connected and a third arm providing a lever for rotating the bell crank, a hygroscopic element in the form of a cable of hygroscopic material having its one end anchored to said dial plate and its other end connected to the said third or driving arm of the bell crank, means biasing said bell crank in a direction tending to tension said element, said pulley and pointer and said bell crank being dynamically balanced to avoid errors in response should the instrument be tilted to different angular positions.

References Cited in the file of this patent
UNITED STATES PATENTS

| | | |
|---|---|---|
| 2,086,853 | Chappell et al. | July 13, 1937 |
| 2,651,941 | Windsor et al. | Sept. 15, 1953 |